United States Patent
Hopper et al.

(10) Patent No.: US 7,177,652 B1
(45) Date of Patent: Feb. 13, 2007

(54) METHOD AND APPARATUS FOR DETERMINING A PRO-ACTIVE REGION OF A MOBILE AD HOC NETWORK

(75) Inventors: Stephen A Hopper, Denton, TX (US); Jack A Gipson, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 1192 days.

(21) Appl. No.: 09/614,026

(22) Filed: Jul. 11, 2000

(51) Int. Cl.
     *H04Q 7/20* (2006.01)
(52) U.S. Cl. .................. 455/456.1; 455/525; 455/11.1; 455/440; 455/441; 370/326; 370/337; 370/338; 370/442; 370/487; 370/493; 370/519
(58) Field of Classification Search .............. 455/456, 455/525, 11.1, 440, 441; 370/389, 315, 316, 370/319, 326, 337–339, 344, 347, 442, 483, 370/487, 493, 519
     See application file for complete search history.

(56) References Cited

U.S. PATENT DOCUMENTS

| | | | | |
|---|---|---|---|---|
| 5,822,309 A | * | 10/1998 | Ayanoglu et al. | 370/315 |
| 5,987,011 A | * | 11/1999 | Toh | 370/331 |
| 6,028,857 A | * | 2/2000 | Poor | 370/351 |
| 6,061,626 A | * | 5/2000 | Meredith | 701/201 |
| 6,104,712 A | * | 8/2000 | Robert et al. | 370/389 |
| 6,304,556 B1 | * | 10/2001 | Haas | 370/254 |

OTHER PUBLICATIONS

T.Imielinski and J.Navas, "Geographic addressing, routing and resource discoverywith the global positioning system", Rutgers University, NJ, Oct. 19, 1996.*
M.Woo and S.Singh, "Longest life routing protocol (LLRP) for AdHoc networks with highly mobile nodes", WCNC, 2000 IEEE, vol. 3, pp. 1306-1310.*
Sung-Ju Lee and Maria Gerla, "A simulation study of table driven and on-demand routing protocols for mobile ad-hoc networks", IEEE Network, Jul./Aug. 1996.*
D.B.Johnson, "Routing in ad hoc networks of mobile hosts", Mobile computing sytems and applications, 1994, proceedings, pp. 158-163.*

* cited by examiner

*Primary Examiner*—Matthew D. Anderson
*Assistant Examiner*—Sujatha Sharma
(74) *Attorney, Agent, or Firm*—Matthew C. Loppnow; Charles W. Bethards

(57) ABSTRACT

A wireless device for use in an ad hoc network is provided. The wireless device includes a transceiver, a global positioning system, and a controller. The transceiver is capable of receiving positional information from a plurality of remote users. The global positioning system is capable of generating positional information regarding the wireless device. The controller selects a first portion of the plurality of remote users to be within a pro active region of the ad hoc network based upon the positional information, and then maintains information on the remote users selected to be within the pro active region.

24 Claims, 2 Drawing Sheets

METHOD AND APPARATUS FOR DETERMINING A PRO-ACTIVE REGION OF A MOBILE AD HOC NETWORK

FIELD OF THE INVENTION

The present invention relates generally to wireless communications, and, more particularly, to a method and apparatus for operating within a mobile ad hoc network.

BACKGROUND OF THE INVENTION

The field of wireless communications has seen dramatic growth recently. Cellular telephones and pagers are devices commonly owned and used by a wide cross section of the population. Further, devices such as portable personal computers, personal data assistants (PDAs), and the like are becoming more common in the general population of users and have begun to be used in wireless networks.

In an ad hoc wireless network these devices communicate directly with one another and/or are routed through a number of devices to communicate with their ultimate destination. For example, referring now to FIG. 1, a plurality of users 100–118 are dispersed within a given area, and each user 100–118 has a wireless device equipped to communicate with the wireless devices of the other users 100–118. The user 100 may wish to communicate with the user 104. One path or route through which the communications may occur is through the intermediate users 108, 106. That is, the user 100 broadcasts a signal directed to the user 104. The user 108 receives the signal, recognizes that it is directed to the user 104, and passes the signal along. Likewise, the user 106 receives the signal, recognizes that it is directed to the user 104, and passes the signal along to the user 104. Thus, the user 104 ultimately receives the signal.

In a system of this type, each user keeps track of the other users with which it can communicate. As it is an ad hoc network with many users moving relatively randomly, it is inevitable and desirable that users will routinely enter and leave a local area. Thus, each user must periodically update its list of users with whom it can communicate. The process of keeping track of all of the other users with whom a user may communicate can consume substantial processing resources of the wireless device. That is, the wireless device may be unable, or at least inefficient at, keeping up-to-date information on all users with which it may communicate.

Accordingly, it has been suggested that a user A keep track of only those routes to other users that are most likely to be used. The selected users are referred to as being in a pro-active region of the user A relative to the other users, and the remaining users in the area are identified as being in a reactive region. In one suggested system, the wireless device identifies the users in its proactive region by selecting only those other wireless devices that are within two "hops." That is, if a user can reach another user, but it requires that the communication be forwarded by more than two intermediate devices, then the user is designated to be in the reactive region. Such a system is attractive because of its simplicity, but it will often result in inferior, or at least suboptimal, pro-active regions.

A two hop pro-active region does not take into account a number of significant factors. For example, while the pro active radius may be set to only two hops, geographic features, such as mountains, may exclude other desired users from the pro active region. Likewise, the two hop pro-active region may include a user that is currently only one hop distant, but may be moving quickly in a direction to take the user entirely outside the pro active region, or at least beyond the two hop limit. Determining which devices fall within the pro-active region, as opposed to the reactive region has proven problematic.

The present invention is directed to overcoming, or at least reducing the effects of, one or more of the problems set forth above.

BRIEF DESCRIPTION OF THE DRAWINGS

The invention may be understood by reference to the following description taken in conjunction with the accompanying drawings, in which like reference numerals identify like elements, and in which.

Figure 1:
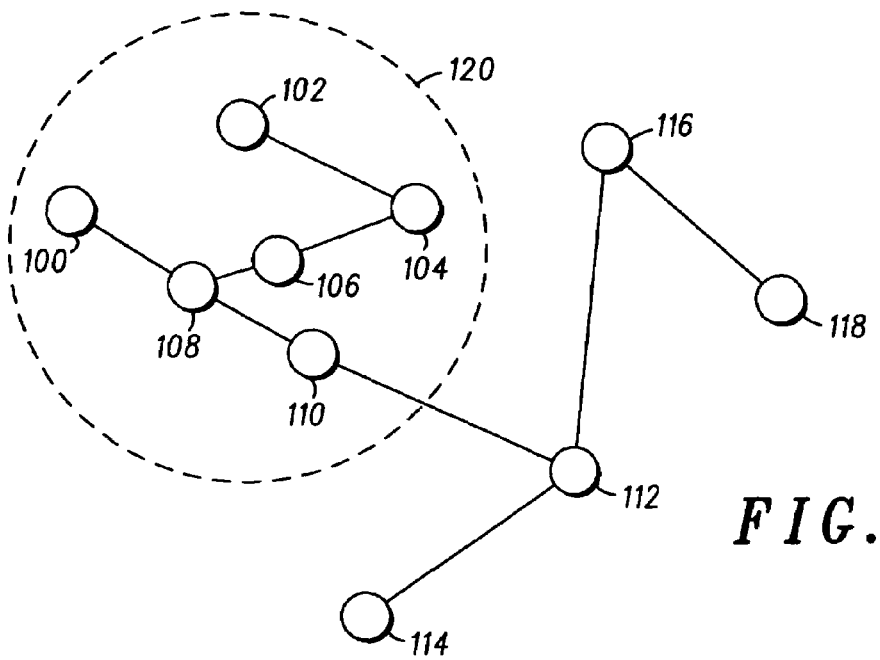
FIG. 1 is a stylized diagram of a network of wireless devices.

While the invention is susceptible to various modifications and alternative forms, specific embodiments thereof have been shown by way of example in the drawings and are herein described in detail. It should be understood, however, that the description herein of specific embodiments not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments in accordance with the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
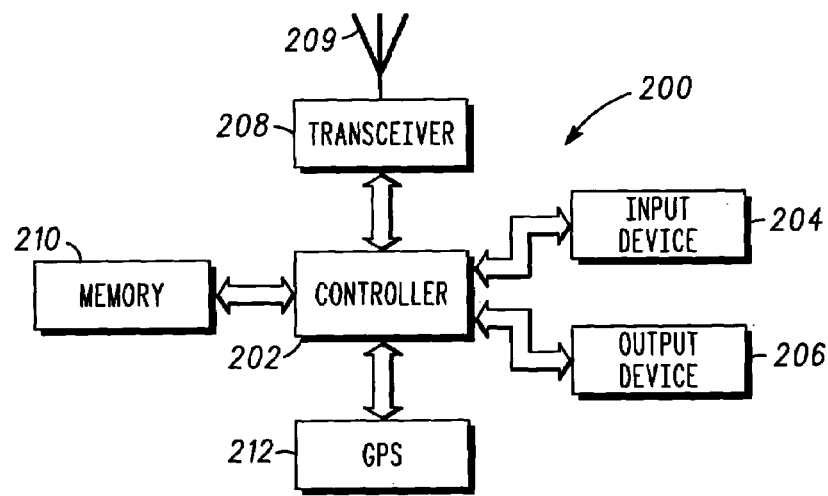
FIG. 2 is a block diagram of one embodiment of the wireless devices of FIG. 1 in accordance with the present invention.

Turning now to the drawings, and in particular to FIG. 2, a stylized representation of a generic wireless device 200, such as a cellular phone, a PDA, a pager, a computer, and the like, is shown. The wireless device 200 includes a controller 202 advantageously employing aspects of the current invention that may take on a variety of forms, such as a hard-wired controller, a microprocessor, and the like. In the embodiment described herein, the controller 202 is assumed to be a microprocessor operating under the control of a software program.

A user of the wireless device 200 enters information into and receives information therefrom via an input device 204 and an output device 206, respectively. The input device 204 may take on any of a variety of forms, including but not limited to, a keypad, a keyboard, a mouse, a pointer, a stylus, a microphone, a touch sensitive screen, and the like. The output device 206 may also take on any of a variety of forms, including but not limited to, a display panel, a liquid crystal display (LCD), a light emitting diode (LED), a plasma display, a speaker, and the like.

A transceiver 208 is coupled to the controller 202, and operates to deliver and receive information over a wireless link via transmissions through an antenna 209. The transceiver 208 can take on any of a wide variety of forms, including but not limited to a radio capable of transmitting and receiving radio frequency (RF) signals, an optical device capable of transmitting and receiving optical signals in a preselected frequency range, such as infrared signals, a microwave transceiver, and the like. In any event, the transceiver 208 allows the wireless device 200 to communicate with other wireless devices within a preselected wireless network.

A memory 210 is coupled to the controller 202. The memory 210 may take on any of a wide variety of forms, including but not limited to, dynamic random access memory (DRAM), static random access memory (SRAM), programmable read only memory (PROM), electrically erasable/alterable ROM (EEROM/EAROM), an optical disk drive, a magnetic disk drive, and the like. The memory 210 is capable of storing a wide variety of information/data. For example, the memory 210 may be used to store a software program capable of controlling the overall operation of the wireless device 200 when executed by the controller 202. The memory 210 may also be used to store information/data received from the transceiver 208, the input device 204, a global positioning system (GPS) 212, and the like. At least a portion of a software program used to control select aspects of the operation of the wireless device 200 are discussed in greater detail below in conjunction with the flowcharts of FIGS. 3 and 5.

A portion of the detailed description that follows is presented in terms of methods and symbolic representations of operations on data bits within the memory 210. These descriptions and representations are the means used by those skilled in the data processing arts to effectively convey the substance of their work to others skilled in the art. Such a method is here, and is generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
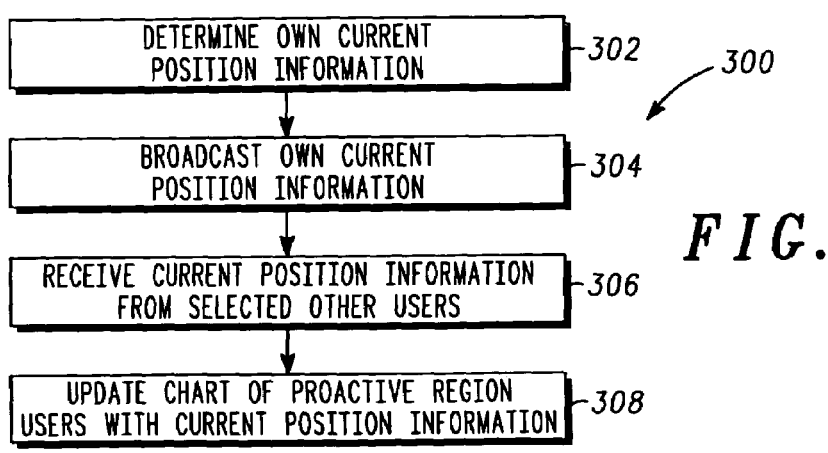
FIG. 3 is a flowchart of one embodiment of a first portion of a control scheme in accordance with the present invention that may be advantageously employed by the wireless devices of FIGS. 1 and 2.

Turning now to FIG. 3, a flowchart of one embodiment of a portion of a control scheme 300 in accordance with and employing aspects of the instant invention is shown. The flowchart of FIG. 3 represents, preferably, a software program that is stored in the memory 210 and is executed within the controller 202 of FIG. 2. The flowchart of FIG. 3 represents only a portion of the software that may be executed by the controller 202. In particular, the flowchart of FIG. 3 represents a portion of the software that governs operations of the controller 202 with respect to the GPS device 212. The controller 202 may perform functions other than those illustrated in the flowchart of FIG. 3; however, these additional functions are not discussed in detail herein to avoid unnecessarily obscuring the instant invention.

Operation of the control scheme 300 begins at block 302 with the controller 202 retrieving position information from the GPS system 212. The position information may reflect only the current position, but in some embodiments may be expanded to include other information, such as heading and speed. Determining heading and speed information may be accomplished in a relatively straightforward manner based upon past position information. That is, the controller 202 may use one or more of the previous positions to determine any change in position, and thus, the direction and speed that the user is moving. In one embodiment, the calculation of heading and speed information may be accomplished by each user regarding its own movements and then broadcast to the other users in the area. Alternatively, each user may broadcast its current position only, and each user would then calculate any heading and speed information for all of the users in its pro-active region. Independent of where the calculations are performed, each user broadcasts its current position information to other users at block 304

In block 306, each of the users receives current position information from other users in the area. The current position information received from the other users is used to update a data structure, such as a table or chart in the memory 210 of those users determined to be in the pro-active region 120, as shown in block 308. One exemplary representation of a table of position information of users in the pro active region 120 is shown below in Table A.

TABLE A

EXEMPLARY POSITIONAL INFORMATION FOR USERS IN THE PRO ACTIVE REGION

| USERS | POSITION | HEADING | SPEED |
| --- | --- | --- | --- |
| User 100 | 90°15'35" long. 34°12'32" lat. | 0° | 0 ft/sec |
| User 102 | 90°15'31" long. 34°12'35" lat. | 15° NNE | 2 ft/sec |
| User 104 | 90°15'26" long. 34°12'31" lat. | 15° NNE | 100 ft/sec |
| User 108 | 90°15'32" long. 34°12'29" lat. | 15° SSW | 50 ft/sec |
| User 110 | 90°15'29" long. 34°12'27" lat. | E | 10 ft/sec |
| User 112 | 90°15'15" long. 34°12'20" lat. | 0° | 0 ft/sec |
| User 114 | 90°15'28" long. 34°12'15" lat. | 15° NNE | 5 ft/sec |

TABLE A-continued

EXEMPLARY POSITIONAL INFORMATION FOR USERS IN THE PRO ACTIVE REGION

| USERS | POSITION | HEADING | SPEED |
|---|---|---|---|
| User 116 | 90°15'14" long. 34°12'33" lat. | N | 25 ft/sec |
| User 118 | 90°15'08" long. 34°12'27" lat. | S | 10 ft/sec |

Figure 4:
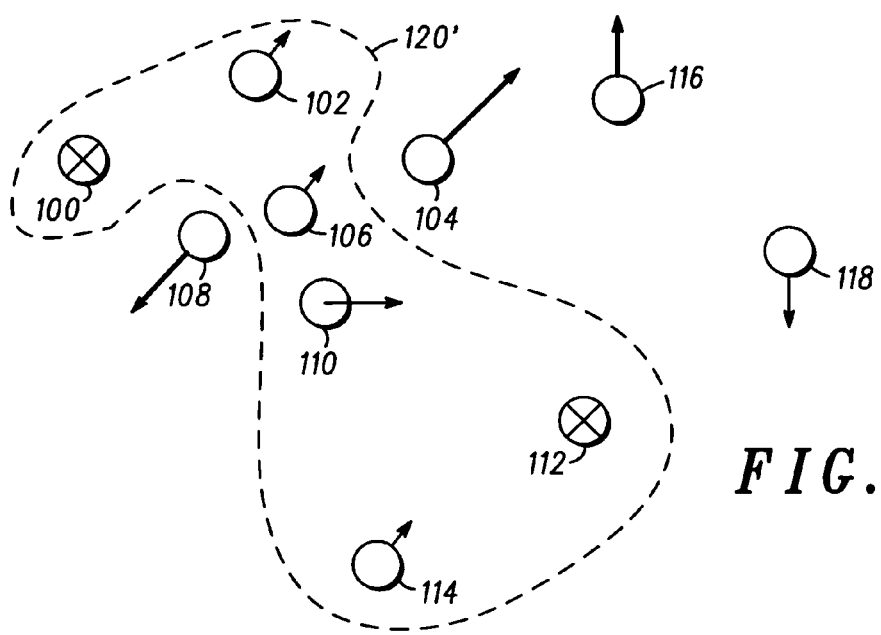
FIG. 4 is a stylized diagram of a network of wireless devices.

Generally, the information contained in Table A is used by the controller 202, under software control, to determine the pro active region for the current area. The stylized drawing of FIG. 4 illustrates the ad hoc network of users 100–118 arranged similar to that of FIG. 1. FIG. 4, however, schematically illustrates at least some of the positional information of Table A that was obtained or derived from the GPS 212. For example, the heading information is illustrated by vectors extending diametrically outward from each of the users 100–118, except for stationary users 100 and 112, which are identified with an X. Further, the speed or velocity of each of the users 100–118 is represented by the size of the vector extending therefrom. That is, the larger the vector, the faster the user 100–118 is moving.

Figure 5:
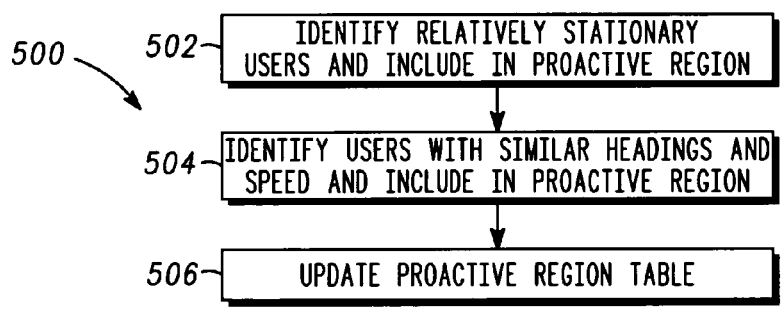
FIG. 5 is a flowchart of one embodiment of a second portion of a control scheme in accordance with the present invention that may be advantageously employed by the wireless devices of FIGS. 1 and 2.

Turning now to FIG. 5, a flowchart of one embodiment of a portion of a control scheme 500 employing aspects of the instant invention is shown. The flowchart of FIG. 5 represents a software program that operates within the controller 202 of FIG. 2. The flowchart of FIG. 5 represents only a portion of the software that may reside in the controller 202. In particular, the flowchart of FIG. 5 represents the portion of the software that governs determining the pro-active region of the ad hoc network. The controller 202 may perform functions other than those illustrated in the flowchart of FIG. 5; however, these additional functions are not discussed in detail herein to avoid unnecessarily obscuring the instant invention.

Referring now to both FIGS. 4 and 5, operation of the software program begins at block 502 where the controller 202 uses the positional information to begin determining a modified pro active region 120' for, for example, the user 106. In block 502, the controller 202 identifies those users that are substantially stationary. It may be useful to include all local, stationary users in the pro active region 120' of the ad hoc network. The user 106 is likely to be able to maintain a high quality communication link with stationary users. Thus, in the exemplary ad hoc network of FIG. 4, the users 100, 112 are identified as stationary, and are thus included in the pro active region 120'.

In block 504, the controller 202 identifies those users that have headings and speeds similar to the user 106. It is likely that the user 106 will be able to maintain a high quality communication link with those users that are moving in substantially the same direction and the same speed as the user 106. Thus, the users 102, 114 are identified as being within the pro active region 120'. While the speed of the users 106, 114 differ, both are moving fairly slowly and in identical directions. Therefore, the users 106, 114 should remain relatively close for an extended period of time, and thus, warrants including the user 114 in the pro active region 120'.

Finally, the user 110 is included in the pro active region 120' despite its different heading because its speed and heading are still sufficiently close to those of the user 106 as to justify the user 110 in the pro active region 120'. On the other hand, the users 116, 118, 108 are excluded from the pro active region because both their heading and speed are sufficiently different from those of the user 106 to ensure that they will relatively quickly move substantially away from the user 106. The user 104 is not included in the pro active region 120' principally because even though it is traveling in the same direction as the user 106, its speed is substantially higher. Thus, the user 104 is also likely to relatively quickly move substantially away from the user 106.

In block 506, the table containing information, such as positional information, on the users in the pro active region 120' is updated by removing those users, such as users 104, 108, 116, 118, from the table. Thereafter, the user 106 may periodically request updated positional information from each of the users included in the pro active region 120'. Alternatively, the user 106 may wait for each of the users in the pro active region to broadcast their positional information, as described in conjunction with FIG. 3. In any event, the user 106 periodically reevaluates the users that have been included in its pro active region 120'.

Accordingly, the positional information obtained from the GPS 212 is used by the controller 202 to arrive at a pro active region 120' that differs substantially from the pro active region 120 (FIG. 1) determined using the "two hop" method without the benefit of positional information. The pro active region 120' will ordinarily result in more efficient operation of the communication device of the user 106, which will produce higher quality communications for longer periods of time.

Other information may also be employed by the user 106 to further optimize the determination of the pro active region. For example, in some cases it may be advantageous to include topographical maps in the memory 210. The users 100–118 may be located on the topographical maps to determine if any naturally occurring geographic formations may interfere with communications. For example, in the exemplary ad hoc network illustrated in FIG. 4, the user 100 may be located on the opposite side of a mountain from the user 106. Thus, while the positional information may be used to select the user 100 as a candidate for inclusion in the pro active region 120' of the user 106, topological information indicates otherwise. Thus, using geographic maps, the user 100 would be excluded from the pro active region 120'.

In addition to naturally occurring topographical information, it may also be useful to include topographical maps of manmade structures. In large cities, buildings may obstruct communications between adjacent users. For example, in the exemplary ad hoc network illustrated in FIG. 4, the user 100 may be located on the opposite side of a skyscraper from the user 106. Thus, while the positional information may be used to select the user 100 as a candidate for inclusion in the pro active region 120' of the user 106, topological information again indicates otherwise. Thus, using topographical building maps, the user 100 would be excluded from the pro active region 120'.

Figure 6:
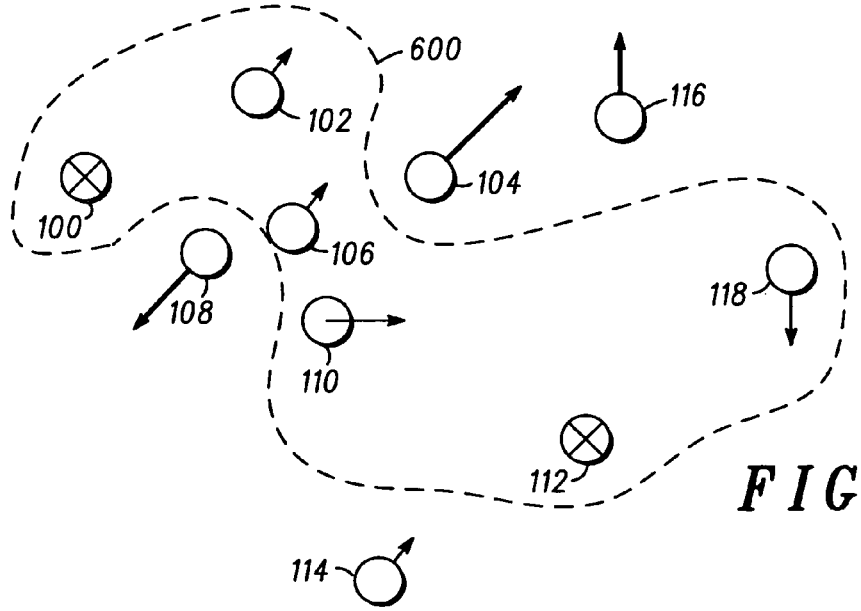
FIG. 6 is a stylized representation of an exemplary RF map.

RF maps similar to that stylistically and simplistically illustrated in FIG. 6 may further optimize the process of selecting the users included in the pro active region 120'. RF maps may be used in lieu of, or in addition to, the topographical maps discussed above. An RF map may be developed and stored in the memory 210 of the wireless device 200 and then used to further optimize the selection of the users 100–118 to be included in the pro active network.

The RF map indicates the strength of radio frequency signals at various locations relative to the current position of the user 106. Thus, when the RF map is overlayed onto the current positions of users 100–118, the user 106 will be able to identify the users 100–118 that are positioned to transmit/receive a strong signal to/from the user 106. That is, the users 100–118 falling within low strength areas of the RF map are excluded from the pro active region, whereas the users 100–118 falling within high strength areas of the RF map are included in the pro active region.

In the exemplary but simplistic representation of the RF map of FIG. 6, the users 100, 102, 106, 110, 112, and 118 fall within a relatively strong RF region 600. Thus, the user 106 would select each of these users to be in the pro active region. It should be appreciated that the RF map of FIG. 6 is simplistic in that it includes only a high strength region 600. In practice, the RF map may include multiple zones reflecting multiple strengths of the RF signal. That is, the RF map may include very high, high, medium, low, and very low strength zones. The controller 202 of the user 106 may be programmed to select users for its pro active region based upon a weighting of the positional information and the RF map information. That is, even though a user may fall within a medium strength RF zone, it may still warrant inclusion in the pro active region if its positional information reveals that it is relatively stationary or moving at the same direction and speed as the user 106.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of operating a wireless device, comprising:
   receiving positional information from a plurality of users in an ad hoc network;
   selecting a first portion of the plurality of users to be within a pro active region based upon said positional information;
   maintaining information on the users selected to be within the pro active region; and
   accessing topographical information on a region in which the wireless device is currently located,
   wherein selecting the first portion of the plurality of users further comprises selecting the users based on the positional and topographical information.

2. A method, as set forth in claim 1, wherein receiving said positional information further comprises receiving information on the position, heading, and speed of the plurality of users in the ad hoc network.

3. A method, as set forth in claim 2, wherein selecting the first portion of the plurality of users further comprises selecting the users that are relatively stationary to be within the pro active region.

4. A method, as set forth in claim 2, further comprising determining the position, heading and speed of the wireless device, and wherein selecting the first portion of the plurality of users further comprises selecting the users that have a position, heading and speed similar to that of the wireless device to be within the pro active region.

5. A method, as set forth in claim 1, further comprising calculating a heading and speed of the plurality of users in the ad hoc network.

6. A method, as set forth in claim 5, wherein selecting the first portion of the plurality of users further comprises selecting the users that are relatively stationary to be within the pro active region.

7. A method, as set forth in claim 5, further comprising determining the position, heading and speed of the wireless device, and wherein selecting the first portion of the plurality of users further comprises selecting the users that have a position, heading and speed similar to that of the wireless device to be within the pro active region.

8. A method, as set forth in claim 1, wherein selecting the first portion of the plurality of users further comprises selecting the users based on the absence of topographical features that could interfere with communications between the wireless device and the selected users.

9. A method, as set forth in claim 1, further comprising accessing a radio frequency map of a region in which the wireless device is currently located, and wherein selecting the first portion of the plurality of users further comprises selecting the users based on the positional information and the radio frequency map.

10. A method, as set forth in claim 9, wherein selecting the first portion of the plurality of users based on the positional information and the radio frequency map further comprises selecting the users located within relatively high strength regions of the radio frequency map.

11. A method, as set forth in claim 1, wherein the topographical information comprises topographic maps of manmade structures.

12. A method, as set forth in claim 1, wherein the topographical information comprises topographic maps including naturally occurring geographic formations.

13. A wireless device for use in an ad hoc network, comprising:
   a transceiver capable of receiving positional information from a plurality of remote users;
   a global positioning system capable of generating positional information regarding the wireless device; and
   a controller capable of selecting a first portion of the plurality of remote users to be within a pro active region based upon said positional information, and maintaining information on the remote users selected to be within the pro active region,
   wherein the controller is capable of accessing topographical information on a region in which the wireless device is currently located, and selecting the first portion of the plurality of remote users based on the positional and topographical information.

14. A wireless device, as set forth in claim 13, wherein said transceiver is capable of receiving positional information that includes information on the position, heading, and speed of the plurality of remote users in the ad hoc network.

15. A wireless device, as set forth in claim 14, wherein the controller is capable of selecting the first portion of the plurality of remote users by selecting the users that are relatively stationary to be within the pro active region.

16. A wireless device, as set forth in claim 14, wherein the controller is capable of selecting the first portion of the plurality of remote users by selecting the remote users that have a position, heading and speed similar to that of the wireless device to be within the pro active region.

17. A wireless device, as set forth in claim 13, wherein the controller is capable of calculating a heading and speed of the plurality of remote users in the ad hoc network.

18. A wireless device, as set forth in claim 17, wherein the controller is capable of selecting the first portion of the plurality of remote users by selecting the users that are relatively stationary to be within the pro active region.

19. A wireless device, as set forth in claim 17, wherein the controller is capable of selecting the first portion of the plurality of remote users by selecting the remote users that have a position, heading and speed similar to that of the wireless device to be within the pro active region.

20. A wireless device, as set forth in claim 13, wherein the controller is capable of selecting the first portion of the plurality of remote users based on the absence of topographical features that could interfere with communications between the wireless device and the selected remote users.

21. A wireless device, as set forth in claim 13, wherein the controller is capable of accessing a radio frequency map of a region in which the wireless device is currently located, and selecting the first portion of the plurality of users based on the positional information and the radio frequency map.

22. A wireless device, as set forth in claim 13, wherein the topographical information comprises topographic maps of manmade structures.

23. A wireless device, as set forth in claim 13, wherein the topographical information comprises topographic maps including naturally occurring geographic formations.

24. A method of operating a wireless device, comprising:

receiving positional information from a plurality of users in an ad hoc network;

accessing topographical information on a region in which the wireless device is currently located, wherein the topographical information comprises a topographic map of formations that may interfere with communications between the plurality of users;

selecting a first portion of the plurality of users to be within a pro active region based upon the positional information and the topographical information; and maintaining information on the users selected to be within the pro active region.

* * * * *